July 4, 1944.  A. KING  2,352,719
FOLDING MICROSCOPE
Filed Oct. 3, 1942
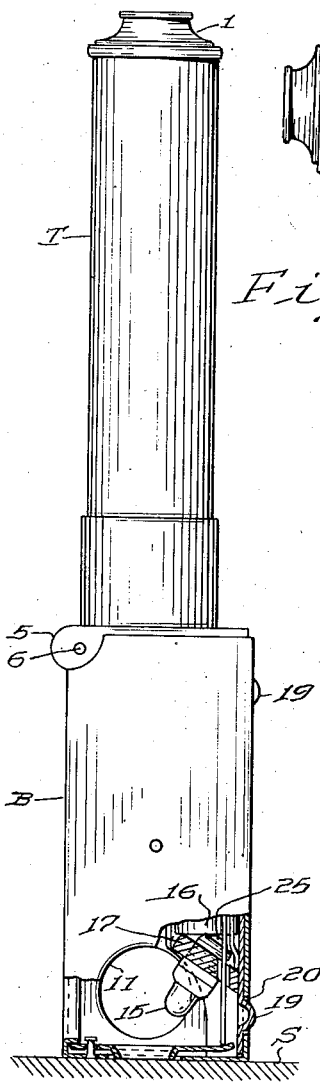
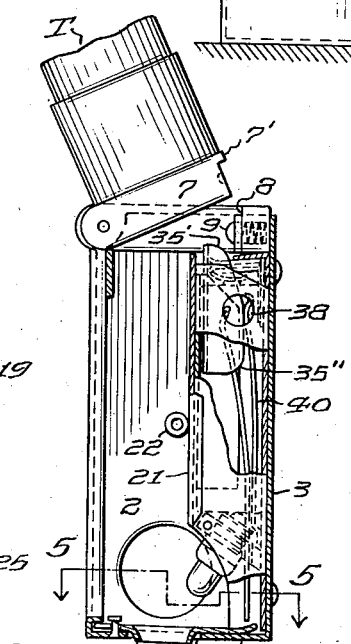
INVENTOR
Andrew King.
BY George K. Helbut
ATTORNEY
WITNESS
F. J. Hartman.

Patented July 4, 1944

2,352,719

UNITED STATES PATENT OFFICE 2,352,719

FOLDING MICROSCOPE

Andrew King, Narberth, Pa.

Application October 3, 1942, Serial No. 460,635

4 Claims. (Cl. 88—39)

A principal object of my invention is to provide a microscope primarily designed for reading the size of the impressions left in a test piece of metal by the ball point of a Brinell hardness testing machine but which also may be employed for examining textiles, paper and numerous other articles preferably when supported on a flat surface, yet which is so constructed that it may be compactly folded for introduction to a case of convenient dimensions for transportation in the user's pocket or otherwise.

A further object is the provision in an instrument of the character aforesaid of illuminating means so arranged that when the instrument is placed in operative position on a surface to be inspected that portion of the latter in the field of view will be automatically and adequately illuminated.

These as well as other objects, advantages and novel details of designs, construction and arrangement comprehended by the invention are hereinafter more fully pointed out or will be readily apparent to those skilled in the art from the following description of a microscope constructed in accordance with the invention and illustrated in the accompanying drawing.

In the said drawing, Fig. 1 is a side elevation of the instrument resting in operative position upon a surface of which a portion is to be viewed, the lower part of the instrument base being fragmentarily broken away into vertical section;

Fig. 2 is a side elevation of the instrument in folded position;

Fig. 3 is a vertical section through the instrument base substantially on line 3—3 in Fig. 6 with certain parts of the switch housing broken away to better show internal construction and with the tube fragmentarily shown in elevation in angular position with respect to the base;

Fig. 4 is a generally similar view but with the tube in operative position with respect to the base and, similarly to Fig. 1, with the latter resting upon a surface a portion of which is to be viewed;

Fig. 5 is a horizontal section through the base substantially on the line 5—5 in Fig. 3;

Fig. 6 is a similar section substantially on line 6—6 in Fig. 4; and

Figs. 7 and 8 are respectively enlarged detail views showing the upper end of the battery and adjacent parts.

Throughout the drawing like characters of reference designate the same parts and the various sectional views are in the directions indicated by the arrows on the corresponding section lines.

As shown in the drawing, the instrument comprises essentially the tube T, base B and illuminating means hereinafter more fully described, the tube in the customary way slidably housing at its upper end the eye piece 1 and at its opposite or lower end, the usual objective lens (not shown), a suitably graduated reticule being preferably disposed within the tube to facilitate determination of the size of the impressions left by the Brinell machine if the instrument is primarily intended for that purpose. As these several parts are of the construction commonly found in microscopes further description of them would be superfluous.

The base B is, in general, a hollow shell or box, rectangular in cross section, comprising opposed sides 2—2, back 3 and bottom 4; is desirably open at its front save near its upper end, and is preferably made of metal and furnished adjacent said end with a pair of ears 5—5 extending from the sides. Between these ears on a pivot 6 is hinged a rectangular block 7 bored out for reception of the lower end of tube T which is suitably secured therein so that in effect the block forms the bottom of the tube. This block seats snugly in the upper end of the base when the tube is in operative position and on the side opposite the hinge is provided with a small flange 7′ which then engages in a channel 8 in the base and forms a stop to insure correct alignment of the parts, a spring-pressed ball 9 cooperative with a depression in the block yieldingly holding the parts in position once this alignment is attained. Thus by relatively moving the tube and base about pivot 6 they may be brought to operative position as shown in Fig. 1 or folded together as in Fig. 2 to facilitate disposition of the instrument in a pocket case for convenient transportation.

The bottom of the base is closed save for an aperture 10 aligned with the axis of the tube, and to facilitate locating this aperture over the area to be viewed through the instrument a pair of aligned holes 11 may be formed in its sides 5—5 adjacent the bottom.

It will of course be understood that the length of the base is such that when the instrument is in operative position with the bottom of the base resting on a surface S, as in Fig. 1, that portion of the latter exposed through aperture 10 will be in proper focus and consequently that the distance from said surface substantially corresponds to the focal length of the objective in the tube; the instrument may therefore be considered as one of "fixed focus" since no adjustment is required to bring the article to be viewed into proper focus for observation through the eye piece.

Mention has been made of the means embodied in the instrument for automatically illuminating the surface being observed when the instrument is resting thereon and more particular reference thereto will now be made. Essentially the said means consist of an electric lamp 15 and a small battery 16 for energizing it, supporting means therefor, and switch mechanism adapted to energize the lamp from the battery under certain conditions and to maintain it deenergized under substantially all others.

The lamp is threaded into and supported by a block 17 which extends transversely in a trough-shaped preferably sheet metal housing 18 removably disposed in and adjacent back 3 of the base; it can be inserted in the latter through its open end when tube T is turned back therefrom and then fits snugly within the base and is centered therein by small struck-up projections 19 registering with holes 20 in back wall 3. A removable cover 21 having flanges at its longitudinal edges adapted to engage over the free edges of the housing is provided; this cover, after the housing is in position, also can be slid into place thereover through the end of the base so as to close the open side of the housing and engage beneath a pair of studs 22 projecting inwardly from sides 2—2 to hold the cover in place. The cover terminates in approximate alignment with block 17, which is inclined at an angle of about 45° so as to direct lamp 15 generally toward aperture 10 in the bottom of the base, and below the block the side walls of the housing are cut away somewhat (see Figs. 3 and 4) to enable an unobstructed view to be obtained through holes 11. Preferably the lower face of lamp block 17, the inner faces of the sides and bottom of the housing below the base and the entire interior of instrument base B are painted white so as to absorb as little of the light of the lamp as possible and form a reflecting surface for it.

The trough-like housing 18 and its cover form a receptacle for a small dry battery 16 of the flashlight type which is removably seated therein between the central terminal 25 of the lamp contacting the base or negative pole of the battery and a spring clip 26 engaging its positive terminal 27 as best shown in Figs. 7 and 8. This clip is suitably fixed to the housing but is insulated therefrom by sheet insulating material 28 and the end 18' of the housing is turned up against this material to form a backing for the clip; consequently by first sliding the cover and then the housing out of base B, a worn-out battery can be readily removed and a new one substituted whenever required.

The switching mechanism for making and breaking the circuit through the lamp and battery and now to be described is so designed it is normally effective to complete and maintain the circuit only when the base of the instrument is resting against a substantially flat surface as in Figs. 1 and 4, and to keep the circuit open under all other conditions as when the instrument is folded and in its case, or is being held in the hand or when placed in any position on a supporting surface other than that in which it is customarily used. To this end, a movable contact plate 30 is disposed in base B adjacent its bottom 4 so that one of its ends which is preferably turned slightly upwardly, extends into housing 18 for guidance by its side walls though it can move freely between them, while adjacent its other end the plate is loosely supported on a headed pin 31 extending through the plate. The latter is provided with a hole 32 registering with aperture 10 and the material of the plate proximate the perimeter of the hole is turned downwardly to form a flange 33 which freely projects through the aperture for a short distance, as from one-thirty-second to one-sixteenth of an inch, when the plate is lying on the bottom of the base. Consequently when and as the bottom of base B is brought against a supporting surface, the engagement of flange 33 therewith moves the free end of the plate upwardly from approximately the position shown in Fig. 3 until the edge of the flange is flush with the bottom as in Figs. 1 and 4.

Substantially within housing 18 and near its upper extremity is a cam 35 preferably formed of sheet material bent over on itself to a generally U-shaped configuration in transverse section as best shown in Fig. 6, the cam being disposed in a guide 36 of generally corresponding section soldered or otherwise secured to the adjacent wall of the housing so the cam is capable of a generally longitudinal motion within the guide. This cam is substantially straight along its edge proximate the guide and is loosely supported on the end of a wire plunger 37 the upper end of which is turned at right angles and passed through a hole in and near the center of the cam from which point the body of the plunger extends down through a hole in the lamp support and terminates just a little above the free end of plate 30 when the latter is in normal position as in Fig. 3; to keep the cam from falling out of the housing the turned-over end of the plunger is projected through a hole 38 in the housing wall of sufficient size to allow the end to move freely about therein. The upper end of the cam normally projects slightly beyond the housing and its nose on the side opposite its straight edge is rounded off to form a curved surface 35' while its lower corner remote from said edge is also rounded at 35" for cooperation with a flexible contact spring 40 having its lower end secured near the bottom of housing 18 and its upper end shaped to present a generally rounded surface 40' adapted to contact the lower end of clip 26 when the spring is brought against it by the action of cam 35.

From the foregoing coupled with an inspection of Figs. 3 and 4 it now will be apparent that if plunger 37 is raised when block 7 is out of operative position as in Figs. 2 and 3, the cam will merely slide longitudinally for an amount corresponding to the movement of the plunger, but that if the block is in operative position as in Figs. 1 and 4, that is, if the tube is aligned with base B, the cam, now prevented from longitudinal movement by the block, will swing on the rounded surface 35' and thus project its lower rounded corner 35" against contact spring 40 and force the latter to contact the extended portion of clip 26, as shown in Fig. 4. The circuit from battery terminal 25 through the clip, contact spring, housing 18, lamp support, lamp bushing, filament and terminal 27 to the bottom or negative pole of the battery is thus completed to thereby energize the lamp and keep it energized as long as the plunger is raised so as to hold the spring depressed by the cam. The moment the lifting pressure on the plunger is released, however, the plunger and cam are returned by the spring to the position of Fig. 3, thus breaking the contact between the spring and clip and deenergizing the lamp. Two conditions therefore must be fulfilled to energize the lamp, namely, the tube T must be aligned with base B, i. e., be in operative position, and contact plate 30 must be pushed inwardly until flange 33 is substantially flush with the bottom of the base, and these conditions are normally only met when the instrument is in proper position for taking a reading.

It results that under all ordinary circumstances the lamp is energized only when the instrument is in condition for use and as it is brought against the surface to be observed, and that it remains energized only as long as the instrument is seated on said surface since the circuit is broken immediately it is lifted therefrom and remains broken while the instrument is being transferred to another surface to be observed or if it is folded to the position of Fig. 2 and returned to its case.

My invention therefore provides for reading Brinnel impressions or for other analogous purposes an extremely convenient instrument which can be readily folded to a compact shape for inclusion in a small case readily transportable in the pocket of the user and which embodies means effective substantially only when the instrument is in use for effectively illuminating the observed surface, thus rendering the instrument of particular advantage for making observations in a poor light or in out of the way places.

It will be understood that as the instrument is normally used in upright or substantially upright position as shown in Fig. 1 I have for convenience but in nowise in a restrictive or limiting sense employed such words as "upper," "lower," "bottom" and the like to define the relationship of certain of its parts when it is in such position.

Also, while I have described and illustrated with considerable particularity an embodiment of my invention which I presently prefer as it has been found extremely satisfactory under actual conditions of use, I do not thereby desire or intend to confine myself specifically thereto as numerous changes and modifications may be made in the form, construction and arrangement of the various elements and in their relationship to each other without departing from the spirit and scope of the invention as defined in the appended claims.

Having thus described my invention, I claim and desire to protect by Letters Patent of the United States:

1. A microscope of the class described comprising a base, a lens supporting tube hinged thereto for movement from non-operative position alongside the base to operative position in substantial prolongation thereof, said base having an aperture axially aligned with the tube when in the last mentioned position, an electric lamp proximate the aperture, a battery for energizing the lamp, and switch means including an element cooperative with the tube when the latter is in operative position, a movable contact plate having a portion projecting through the aperture and a plunger interposed between the plate and element whereby when the tube is in operative position in engagement with the element and the plate is moved so as to bring its projecting portion substantially flush with the outer face of the base the plunger actuates the element to complete a circuit including the battery and lamp to energize the latter.

2. In a microscope of the class described, a base, a lens supporting tube hinged to one end thereof for movement from unfolded to folded position, said base having an aperture in its other end axially aligned with the tube when the latter is in the former position, and means adapted to illuminate the vicinity of said aperture only when the tube is in unfolded position and the microscope proximate a surface to be viewed therethrough, said means comprising an electric lamp, a battery, and means for completing a circuit through the battery and lamp including a contact plate loosely supported in the base having an opening aligned with the aperture and a part movable within the latter from a position in which it projects slightly through the aperture to one in which it is substantially flush with the surrounding portion of the base, a plunger actuated by the plate as it is moved from the first to the second position, a cam interconnected with the plunger and engaged by the tube when in unfolded position, and a contact spring actuated by the cam to then complete said circuit when the plate is moved so as to bring its projecting part to said second position.

3. In a microscope of the class described, a lens supporting tube and a base hinged thereto whereby the tube may be moved from unfolded position in substantial prolongation of the base to folded position proximate a side thereof, said base being substantially hollow and having a bottom provided with an aperture aligned with the tube when in unfolded position, a lamp disposed to illuminate the aperture, a battery for energizing the lamp, a movable contact plate having an opening registering with the aperture and a portion extending therethrough when the plate is proximate the bottom but retractable within the aperture, a plunger actuated by the plate during said retraction, a contact spring, and a cam associated with the plunger and movable by the tube to a predetermined position when the tube is unfolded, said cam when in said position being operative to move the spring to close a normally open circuit through the lamp and battery when the plunger is actuated by retractive movement of the contact plate.

4. In a microscope of the class described, a lens supporting tube, and an apertured base hingedly connected for movement into and out of mutual alignment, means for illuminating the vicinity of the aperture comprising an electric lamp and a battery housed in the base, and means for closing a normally open circuit including the lamp and battery after the base and tube are aligned and as the base is brought into proximity with a surface of which a portion is to be viewed through the tube and aperture, said means comprising a contact spring adapted to close the circuit, a moveable cam positioned by the tube when it and the base are so aligned and then operable to move the spring to circuit closing position, and means for actuating the cam including a plunger and a movable element partially projecting through the aperture when the base is remote from said surface but adapted to move the plunger and cam when in turn moved by contact of its projecting portion with said surface.

ANDREW KING.